United States Patent
Goldberg et al.

(10) Patent No.: US 9,886,572 B2
(45) Date of Patent: Feb. 6, 2018

(54) LIE VAULT

(71) Applicant: International Business Machines Corporation, Armonk, NY (US)

(72) Inventors: Itzhack Goldberg, Hadera (IL); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 14/639,170

(22) Filed: Mar. 5, 2015

(65) Prior Publication Data

US 2016/0259935 A1    Sep. 8, 2016

(51) Int. Cl.
*G06F 21/45* (2013.01)

(52) U.S. Cl.
CPC ...... *G06F 21/45* (2013.01); *G06F 2221/2103* (2013.01); *G06F 2221/2131* (2013.01)

(58) Field of Classification Search
CPC ............. G06F 21/45; G06F 2221/2103; G06F 2221/2131
USPC ............................................................. 726/6
See application file for complete search history.

(56) References Cited

U.S. PATENT DOCUMENTS

| | | | |
|---|---|---|---|
| 8,132,265 B2 | 3/2012 | Wootton et al. | |
| 8,255,695 B2 | 8/2012 | Brown et al. | |
| 8,561,174 B2 | 10/2013 | Fischer | |
| 8,819,768 B1 | 8/2014 | Koeten et al. | |
| 8,973,154 B2 | 3/2015 | Yanagihara | |
| 9,411,950 B1* | 8/2016 | Olsen-Kreusch | ....... G06F 21/36 |
| 2009/0006544 A1* | 1/2009 | Liu | ........ H04L 63/105 709/203 |
| 2009/0089876 A1* | 4/2009 | Finamore | ................ G06F 21/40 726/21 |
| 2009/0276839 A1* | 11/2009 | Peneder | .................. G06F 21/31 726/8 |
| 2010/0122341 A1* | 5/2010 | Golle | .............................. 726/21 |
| 2010/0293608 A1* | 11/2010 | Schechter | ........... G06F 17/2785 726/8 |
| 2011/0026688 A1 | 2/2011 | Simpson | |

(Continued)

FOREIGN PATENT DOCUMENTS

| | | |
|---|---|---|
| WO | 2006128295 A1 | 12/2006 |
| WO | 2009128850 A1 | 10/2009 |
| WO | 2013096601 A1 | 6/2013 |

OTHER PUBLICATIONS

Brinkmann, Martin, "Security tip: do not answer security questions correctly", ghacks.net post on Aug. 23, 2012 in Security Last Update:Jan. 31, 2015, 7 pages.*

(Continued)

*Primary Examiner* — Michael Pyzocha
(74) *Attorney, Agent, or Firm* — Patricia B. Feighan (57) ABSTRACT

A method to create and store at least one challenge question transformation (CQT) is provided. The method may include receiving an access query to a user interface associated with a password-recovery challenge question. The method may also include associating the at least one stored CQT with the password-recovery challenge question. The method may further include retrieving the associated CQT from a storage repository.

18 Claims, 6 Drawing Sheets

(56) References Cited

U.S. PATENT DOCUMENTS

| | | | |
|---|---|---|---|
| 2014/0007247 A1* | 1/2014 | Carter | H04L 12/585 726/26 |
| 2014/0137203 A1 | 5/2014 | Castro et al. | |
| 2014/0137219 A1* | 5/2014 | Castro | H04L 63/08 726/6 |
| 2014/0157382 A1* | 6/2014 | Ford | H04L 63/08 726/7 |
| 2014/0244511 A1 | 8/2014 | Weller et al. | |
| 2014/0259130 A1* | 9/2014 | Li | G06F 21/31 726/6 |
| 2014/0289870 A1 | 9/2014 | Selander et al. | |
| 2015/0350187 A1 | 12/2015 | Cramer et al. | |

OTHER PUBLICATIONS

Henry, "Why Social Engineering Should Be Your Biggest Security Concern," lifehacker, Sep. 4, 2014, p. 1-8, http://lifehacker.com/why-social-engineering-should-be-your-biggest-security-1630321227, Accessed on: Feb. 2, 2015.

Mell et al., "The NIST Definition of Cloud Computing," National Institute of Standards and Technology, Information Technology Laboratory, Oct. 7, 2009, Version 15.

* cited by examiner

LIE VAULT

BACKGROUND

The present invention relates generally to the field of computers, and more particularly to password-recovery.

Often, systems require security questions or challenge questions for password reset, to confirm a person's identity, or to assist in authenticating a user. Such systems (e.g., GMAIL and numerous other web sites) may ask a security question, such as a user's mother's maiden name. Then, the user may supply the correct answer, but only later realize that this information is readily available on the Web and therefore, is easily accessible for the public to obtain. As such, a user may wish to supply a "lie" regarding such a challenge question, in an effort to make the response more secure. However, over time, a user can easily forget such lies, as they are idiosyncratic to the cognitive context in which the lie was formulated. Similarly, if a user later wishes to change a valid answer to a lie, the user may become worried that he or she can never determine a useful way to remember the lie, especially if more than one site has asked this challenge question over the years and the user may have lied for some sites, not lied in others, or lied differently on different sites.

SUMMARY

According to one embodiment, a method to create and store at least one challenge question transformation (CQT) is provided. The method may include receiving an access query to a user interface associated with a password-recovery challenge question. The method may also include associating the at least one stored CQT with the password-recovery challenge question. The method may further include retrieving the associated CQT from a storage repository.

According to another embodiment, a computer system to create and store at least one challenge question transformation (CQT) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving an access query to a user interface associated with a password-recovery challenge question. The method may also include associating the at least one stored CQT with the password-recovery challenge question. The method may further include retrieving the associated CQT from a storage repository.

According to yet another embodiment, a computer program product to create and store at least one challenge question transformation (CQT) is provided. The computer program product may include one or more computer-readable storage devices and program instructions stored on at least one of the one or me tangible storage devices, the program instructions executable by a processor. The computer program product may include program instructions to receive an access query to a user interface associated with a password-recovery challenge question. The computer program product may also include program instructions to associate the at least one stored CQT with the password-recovery challenge question. The computer program product may further include program instructions to retrieve the associated CQT from a storage repository.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to password-recovery. The following described exemplary embodiments provide a system, method and program product to, among other things, create a "lie vault" that stores a user's lies and transformation of lies regarding challenge questions and security questions. Therefore, the present embodiment has the capacity to improve the technical field of password-recovery by providing a vault for storing transformations for password-recovery challenge questions (CQTs) and a means for associating the transformations with a website that makes use of challenge questions. More specifically, the present embodiment may assist a user in more easily recalling the transformed information. Furthermore, the present embodiment has the potential to assist people with cognitive challenges, such as autism and pre-Alzheimer's.

As previously described, many systems require security questions or challenge questions for password reset, to confirm a person's identity, or to assist in authenticating a user. A user may wish to supply a "lie" regarding such a challenge question, in an effort to make the response more secure. However, over time, a user can easily forget such lies. Similarly, if a user later wishes to change a valid answer to a lie, the user may never determine a useful way to remember the lie. As such, it may be advantageous, among other things, to provide a "lie vault" that stores a user's lies and transformations of lies regarding challenge questions and security questions.

According to at least one implementation, the present embodiment may provide a vault for storing transformations for password-recovery challenge questions (CQTs) and a means for associating said transformations with a website that makes use of challenge questions. A typical challenge question may be: What is your mother's maiden name? A transformation may be simply the need to spell a maiden name backward instead of the requested maiden name. However, the user may not remember and employ this "lie" (i.e. transformation) on one site and not another site without a service, such as the present embodiment, to assist the user with recalling the transformation.

With typical challenge-response authentication, a family of protocols is used in which one party presents a question ("challenge") and another party must provide a valid answer ("response") to be authenticated. Multi-factor authentication (MFA) that requires the presentation of several authentication factors, for example, a knowledge factor ("something only the user knows"). After the presentation, each factor must be validated by the other party for authentication to occur.

According to at least one implementation of the present embodiment, when the web site challenge-question is, for example: "What is your mother's maiden name?", the vault may store the transformation the user should always use, such as the following:

1) When asked to supply mother's maiden name, instead use your mother's middle name, or reverse spell the name.

2) Whenever asked to supply information about the name of school the user attended, instead, add the letter "b" to the end the school name.

As such, security may now be increased since a violator may not only have to know the user's mother's maiden name but also the transformation needed. Additionally, the user experience may be increased for the real user because the real user does not have to try to recall the transformation since the vault contains the transformation. Furthermore, the present embodiment may be different from a password vault or password manager, which typically is a software application that helps a user store and organize passwords (usually in encrypted form). As such, the present embodiment provides a "lie vault" or "question transformation vault" and does not store passwords. Rather, it is closer to storing transformations for challenge questions, to help avoid hacks dealing with social engineering. As previously described as an example: "When asked to supply mother's maiden name, instead use your mother's middle name."

According to at least one implementation, the transformations may be context-aware. Therefore, depending on the site that the user is accessing, the time of the day, the originating IP address and other factors, appropriate transformation may be applied. Transformations can include composition and decomposition of new questions (e.g., "provide me with the 2nd and 3rd letter of your mother's maiden name"). Contexts may extend beyond the digital environment and into the real world environment through digital capture (e.g., a head mounted camera, a microphone). Contexts may then be identified, for example, visually (e.g., a bank ATM, a checkout register, etc.).

Additionally, the present embodiment is different from a password vault or password manager in that the invention helps the user establish different personas, which aid in remembering which persona is used for challenge-like questions. Most users will never recall what answers they gave for "mother's maiden name" for each different site, however, the present embodiment may assist a user via "personas", which will be described herein in further detail.

Furthermore, the present embodiment may has "cognitive" value since it may assist a user in "remembering" these transformations. For example, the present embodiment may show a user their "persona" which may be used for challenge questions for site A, site B, site C, etc. Also, the present embodiment may have a virtual-world component, in which the virtual world (or 3D game environment) can be used to help a user remember the transformation or recall which persona the user may have used for site A, site B, site C, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a vault for storing transformations for password-recovery challenge questions (CQTs) and a means for associating the transformations with a website that uses challenge questions. A typical challenge question may be one of the following: What is your mother's maiden name? What high school did you go to? What is the name of your first pet? What are the last four digits of your local library card? As such, according to the present embodiment, a transformation may be for example, the need to spell a maiden name backward.

According to at least one implementation, one or more personas may be managed to facilitate the recall of such challenge questions transformations. For example, the user may have "old fisherman Bob" and "young ballerina Olga" as two personas. As such, the present embodiment may store and present a "humanoid image" and/or a "humanoid graphical representation" associated with the persons (i.e., personas) to facilitate the recall of the challenge questions transformations. Additionally, the present embodiment may store and present photos, such as a list of photos of people, a graphical representation of humanoids, or cartoon characters, etc., to facilitate the recall of the challenge questions transformations.

Figure 1:
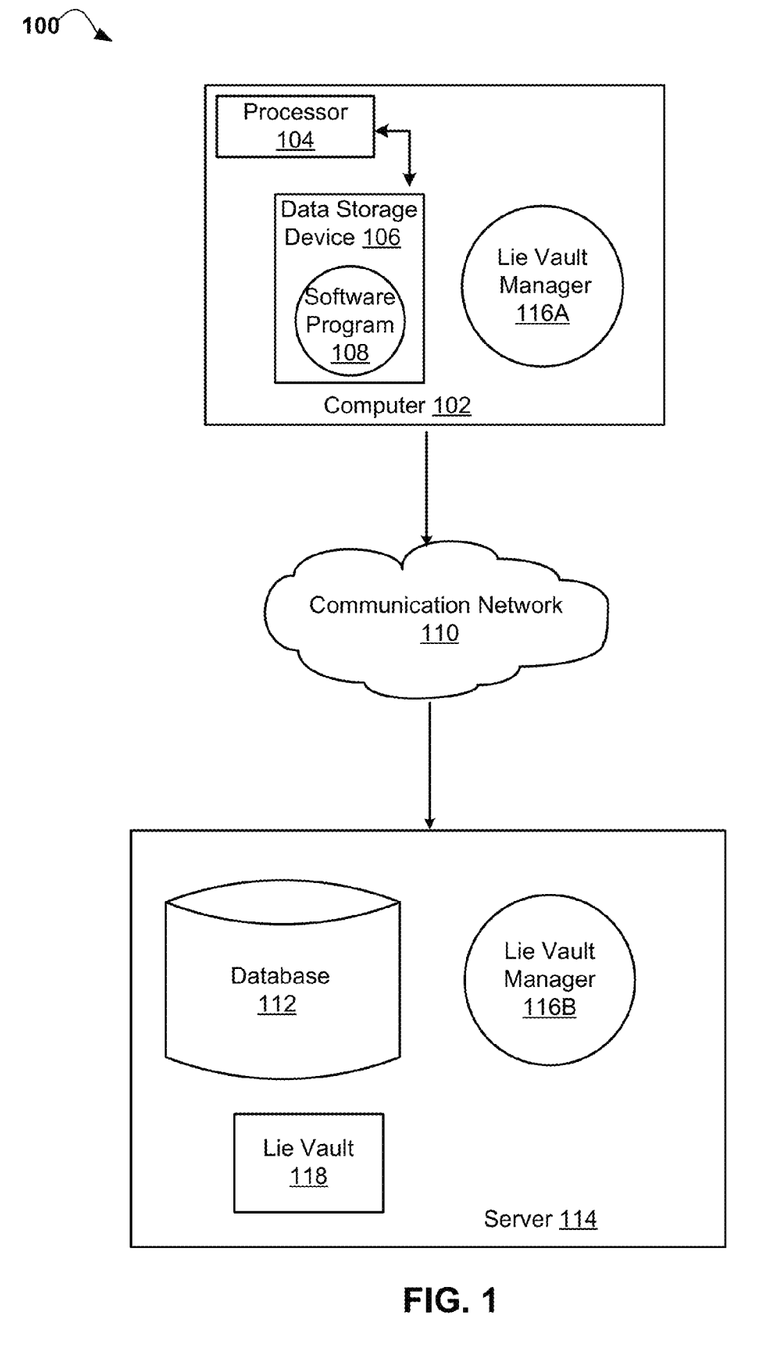
FIG. 1 illustrates a networked computer environment according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Lie Vault Manager 116A. The networked computer environment 100 may also include a server 114 that is enabled to run a Lie Vault Manager 116B that may interact with a database 112, a Lie Vault 118, and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Lie Vault Manager 116B running on server computer 114 via the communications network 110. The communications network 110 may include connections, such as wire, wireless communication links, or fiber optic cables. As will be discussed with reference to FIG. 4, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Lie Vault Manager 116A, 116B may interact with a database 112 and the Lie Vault 118 that may be embedded in various storage devices, such as, but not limited to a mobile device 102, a networked server 114, or a cloud storage service.

As previously described, the client computer 102 may access the Lie Vault Manager 116B, running on server computer 114 via the communications network 110. For example, a user using a client computer 102 may use the Lie Vault Manager 116A, 116B to register with a Lie Vault 118 and create and store transformations for password-recovery challenge questions (CQTs) or transformations for any validation or authentication system in which a user may need to demonstrate or prove that the user is who they claim to be with a challenge question. Additionally, the user may utilize the Lie Vault Manager 116A, 116B as a means for managing and associating the transformations with a website that uses challenge questions. The Lie Vault method is explained in more detail below with respect to FIGS. 2-3.

Figure 2:
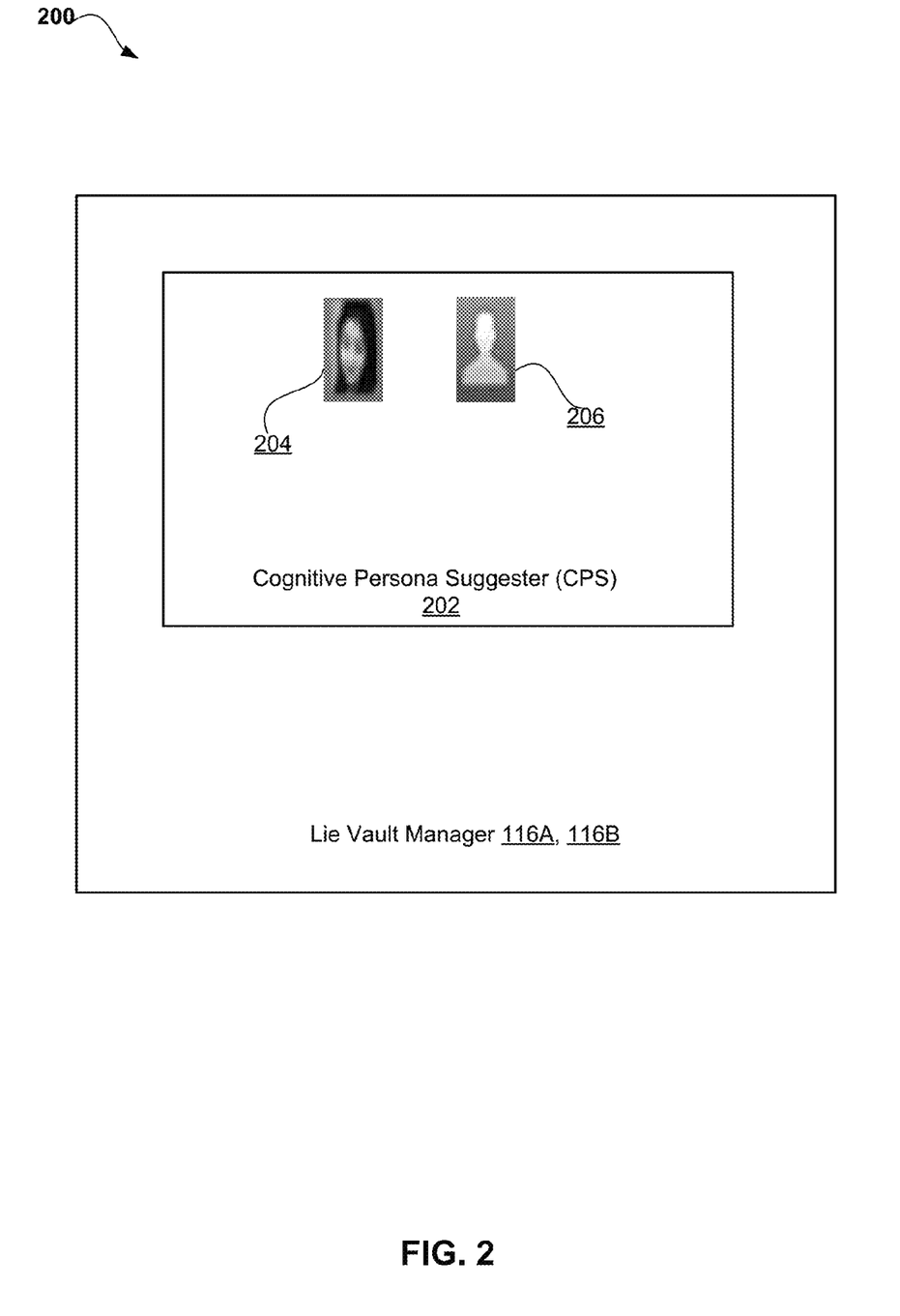
FIG. 2 is an exemplary illustration of a Cognitive Persona Suggester (CPS) according to at least one embodiment.

Referring now to FIG. 2, an exemplary illustration 200 of a Cognitive Persona Suggester (CPS) 202 in accordance with one embodiment is depicted. The Lie Vault Manager 116A, 116B may include a Cognitive Persona Suggester (CPS) 202 which may provide one or more personas 204, 206 to be shown to the user and used for challenge questions for different sites. The one or more personas 204, 206 may be managed by the Lie Vault Manager 116A, 116B to facilitate the user in recalling challenge question transformations (CQTs).

As such, the present embodiment has a Cognitive aspect, providing a way for a user to more easily recall the transformed information. Thus, based on demographics, culture, and other aspects, the system can potentially suggest personas 204, 206, such as an image of a person and characteristics for a person to use for various personas 204, 206. Furthermore the cognitive persona suggester (CPS) 202 may help suggest personas 204, 206, persona characteristics, and challenge-question transformations that may be more readily useable (e.g. memorable) according to a user's age, background, culture, ethnicity, etc. As such, the present embodiment may be utilized by a broad class of users, including those with pre-Alzheimer, autism, etc.

Additionally, according to an alternate embodiment, a virtual universe may be used to manage personas. For example, in a 3D world or game, the user may enter a 3D home with reminders regarding the persona being used at one or more sites. Furthermore, the challenge question transformations (CQTs) and personas 204, 206 may be suggested by the system, to free the user from recalling useful transformations (such as spelling a name backwards or suggesting a middle name rather than a last name). Additionally, one of the personas 204, 206 may be from a different culture, and thus different languages for responses may be appropriate. Also, the persona 204, 206 may relate to a location of the merchant or the location of the consumer or persona 204, 206. Personas 204, 206 may have fictitious social networks and a business network, and as such, these may be accessed. Additionally, personas may have fictitious family trees, childhoods, interests, health histories, pets, educational backgrounds, and the like. User history data of each persona 204, 206 in the plurality of personas 204, 206 may be monitored since the present embodiment is designed to assist a user with remembering and/or storing transformations of challenge questions.

Figure 3:
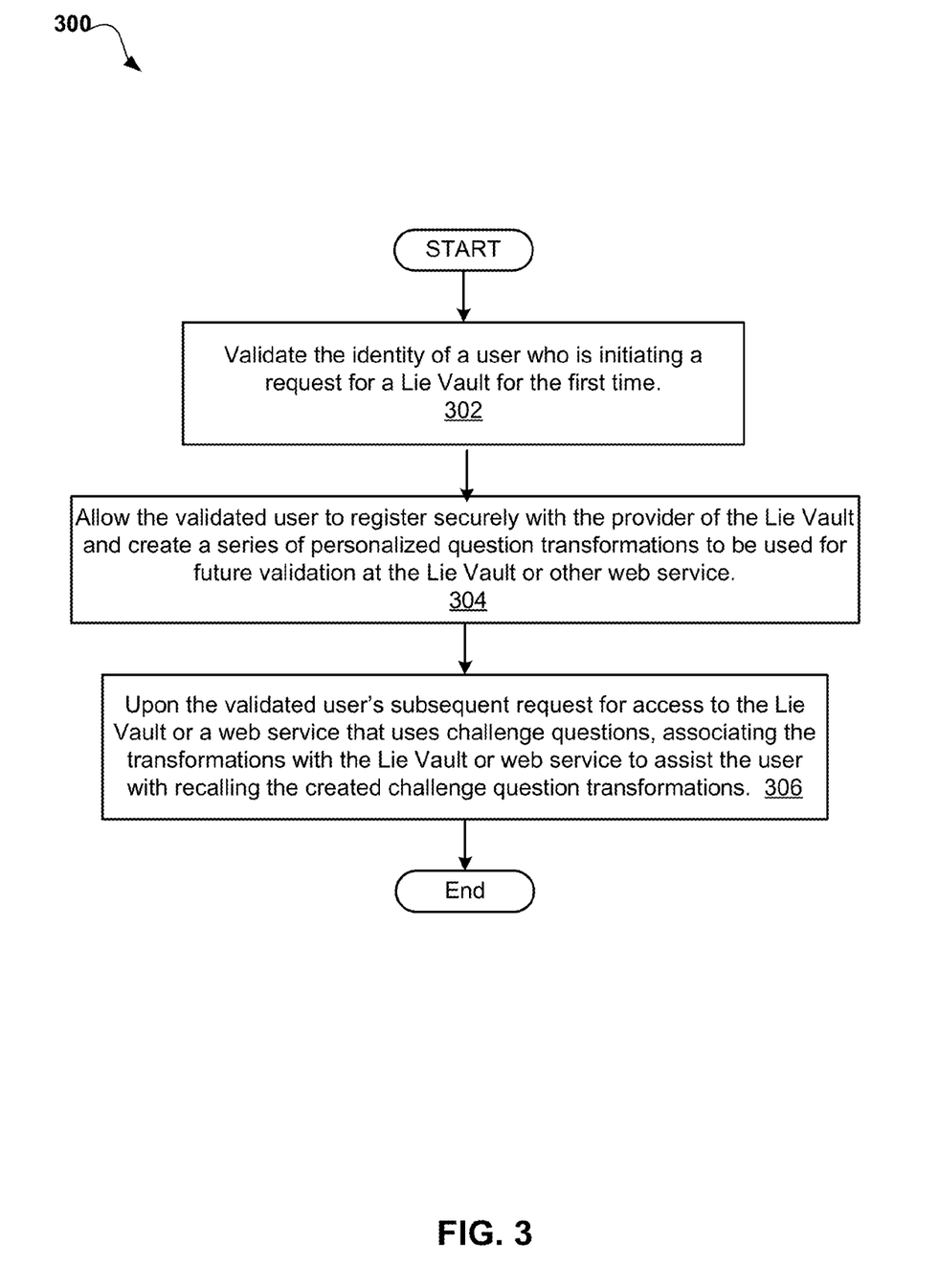
FIG. 3 is an operational flowchart illustrating the steps carried out by a program for managing a Lie Vault according to at least one embodiment.

Referring now to FIG. 3, an operational flowchart 300 illustrating the steps carried out by a program for managing a Lie Vault according to at least one embodiment is depicted. As previously described, the Lie Vault Manager 116A, 116B (FIG. 1) may store a user's lies and transformation of lies regarding challenge questions and security questions. As such, the present embodiment may provide a vault for storing transformations for password-recovery challenge questions (CQTs) and a means for associating the transformations with a website that makes use of challenge questions.

Therefore with respect to FIG. 3 at 302, the Lie Vault Manager 116A, 116B (FIG. 1) will validate the identity of a user who is initiating a request for a Lie Vault 118 (FIG. 1) for the first time. As such, a user may be prompted via a graphical user interface (GUI) to complete a profile and answer questions, such as personal information and credentials, regarding the identity of the user in order for the user to be eligible to register and use the Lie Vault Manager 116A, 116B (FIG. 1).

Then at 304, the Lie Vault Manager 116A, 116B (FIG. 1) will allow the validated user to register securely with the provider of the Lie Vault 118 (FIG. 1) and create a series of personalized question transformations to be used for future validation at the Lie Vault 118 (FIG. 1) or other web service (i.e., a computing interface). As previously described, the transformations may be context-aware. Therefore, depending on the site that the user is accessing, the time of the day, the originating IP address and other factors, appropriate transformation may be applied. Transformations can include composition and decomposition of new questions (e.g., "provide me with the 3rd letter of your grandmother's maiden name").

Next at 306, upon the validated user's subsequent request for access to a computing interface, such as the Lie Vault 118 (FIG. 1) or a web service that uses challenge questions, the Lie Vault Manager 116A, 116B (FIG. 1) associates the transformations with the web service or Lie Vault 118 (FIG. 1) to assist the user with recalling the created challenge question transformations. As such, the present embodiment may store transformations for challenge questions in the Lie Vault 118 (FIG. 1) to help avoid hacks dealing with social engineering. According to at least one implementation, the storing of the challenge question transformation may be associated with an additional real world context surrounding an accessing of the computing interface. For example, when asked to supply a user's mother's maiden name, the method may ask the user to instead use their mother's middle name. According to at least one implementation, the Lie Vault Manager 116A, 116B (FIG. 1) may provide a user with hints or clues to assist the user in recalling the transformations (i.e., transformed answers) to a secret question or a password-recovery challenge question (CQT). Furthermore, as previously described, the present embodiment may have "cognitive" value since it may assist a user in "remembering" these transformations via a cognitive persona suggester (CPS) 202 (FIG. 2) which may provide one or more personas 204, 206 (FIG. 2) to be shown to the user and used for challenge questions for different sites. For example, the present embodiment may show a user their "persona" (as described with respect to FIG. 2 above) which may be used for challenge questions for site A, site B, site C, etc. Also, the present embodiment may have a virtual-world component, in which the virtual world (or 3D game environment)

can be used to help a user remember the transformation or recall which persona the user may have used for site A, site B, site C, etc.

It may be appreciated that FIG. 3 provides only an illustration of one implementation and does not imply any limitations with regard to how different embodiments may be implemented. Many modifications to the depicted environments may be made based on design and implementation requirements. For example, in another embodiment, the system may first validate the identity of a user/individual who is initiating a request for a Lie Vault 118 (FIG. 1) for the first time. Once validated, the user may be allowed to access the Lie Vault 118 (FIG. 1), to register securely with the provider of the Lie Vault 118 (FIG. 1), and to create a series of personalized question transformations to be used for future validation purposes at the Lie Vault 118 (FIG. 1) or other websites. However, during the user's subsequent request for the Lie Vault 118 (FIG. 1) or web service, the user may be asked, in addition to their user name, one or more of the personalized transformed questions that they created on rotation basis in place of a PIN or password.

Furthermore, the lie vault and challenge question transformations may facilitate cloud service access from a user device. The cloud service access and an information gateway may determine an identity of a user making the request to access the cloud service and compare the identity of the user to a password vault control policy, along with the disclosed challenge question transformations. The cloud service access and information gateway may determine, based on the comparing, one or more sections of a Split Password/Lie Vault 118 (FIG. 1) (i.e., the Lie Vault 118 (FIG. 1) designed as a Split Password/Lie Vault 118 (FIG. 1)) to which the user has access. The Split Password/Lie Vault 118 (FIG. 1) may include a first section storing a first set of log-in credentials and a second section storing a second set of log-in credentials.

Therefore, when the Lie Vault Manager 116A, 116B (FIG. 1) helps the user create a question transformation (i.e., a challenge-response transformation) (such as when a Web site asks the mother's maiden name, spell it backwards), the Lie Vault Manager 116A, 116B (FIG. 1) may consider the difficulty level associated with the transformation. Specifically, embodiments of the present invention are directed to secure human challenge response transformation delivery services of configurable difficulty for users and for their devices.

According to various implementations of the present embodiment, the answer-transformation system/device may be interposed between a computer and a conventional computer input device such as a keyboard. As such, challenge questions may be defined at the input device, stored in a preferably encrypted vault and forwarded to a secure application. When the user is prompted for a the challenge question, the device may retrieve the question/transformation/answer from the vault and provide it to the computer in a manner indistinguishable from conventional data traffic, mitigating the likelihood that the innocuous data stream will be monitored to recover the challenge question response. The transmission of a response is push technology and may be enhanced by a gating feature.

Furthermore, in other embodiments, the answer-transformation system/device may provide an additional cue, such as an audio cue from a wearable device to the user and is context aware. Context awareness may be by means of digital coupling between the client machine and the wearable, or by means of a forward facing camera that identifies which interface a user is interacting with. These identifying information are then employed to access a database of password or challenge questions transformations. The wearable device then presents to the user an audio speech cue privately (by means of ear bud, etc.) which may tell the user how to transform the password/answer they are thinking of.

For example, a user may walk up to their ATM machine. Previously the user has set their password while wearing a head mounted device running the Lie Vault Manager 116A (FIG. 1). The Lie Vault Manager 116A (FIG. 1) may prompt the user before entering to "add 1 to the second digit of your normal PIN." As such, the user may be relieved to have had this advice, given that they use the same PIN code for their 8 online financial accounts, and recently one of the bank's systems was hacked. The user did not need to "change their PIN," which they remembered very well for years, but instead simply used the Lie Vault Manager 116A (FIG. 1) to transform the PIN safely in a context dependent manner. As such, when the user approaches the ATM, image recognition software on their wearable device may examine the user's forward-facing camera and sees the user's bank's logo. Therefore, the data for the transformation is recalled based on the identity of the ATM machine, and the user may hear the reminder "add 1 to the second digit of your PIN." Relieved of the cognitive load of remembering a new PIN, the user now just remembers their old one, and may perform the simple arithmetic to access their account.

Figure 4:
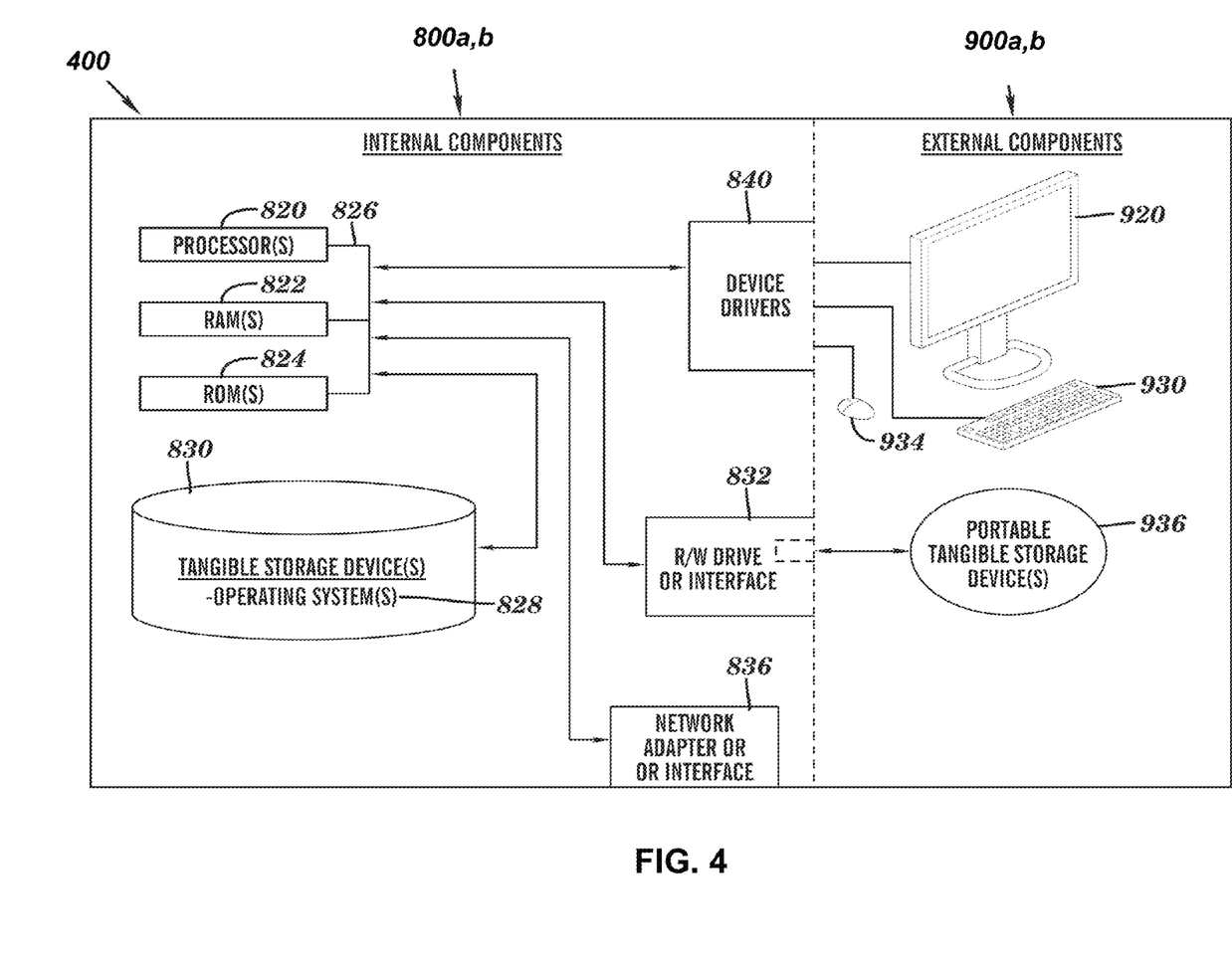
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 4. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Lie Vault Manager 116A (FIG. 1) in client computer 102 (FIG. 1) and the Lie Vault Manager 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Lie Vault Manager 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Lie Vault Manager 116A (FIG. 1) in client computer 102 (FIG. 1) and the Lie Vault Manager 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Lie Vault Manager 116A (FIG. 1) in client computer 102 (FIG. 1) and the Lie Vault Manager 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
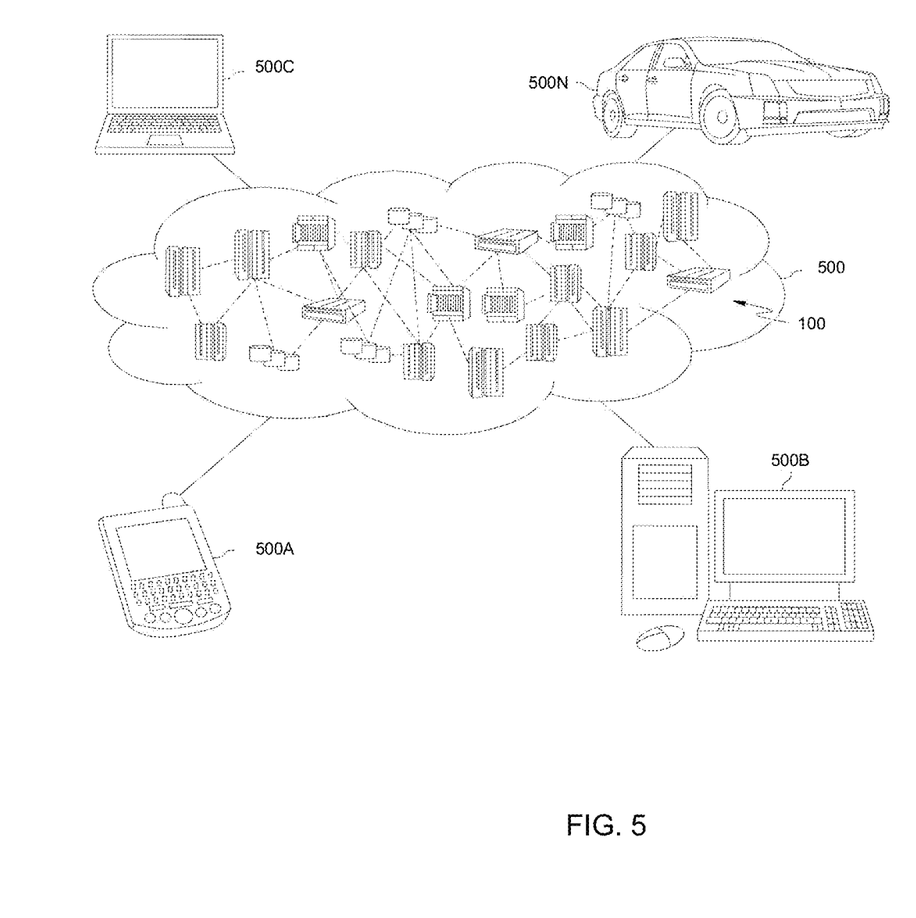
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
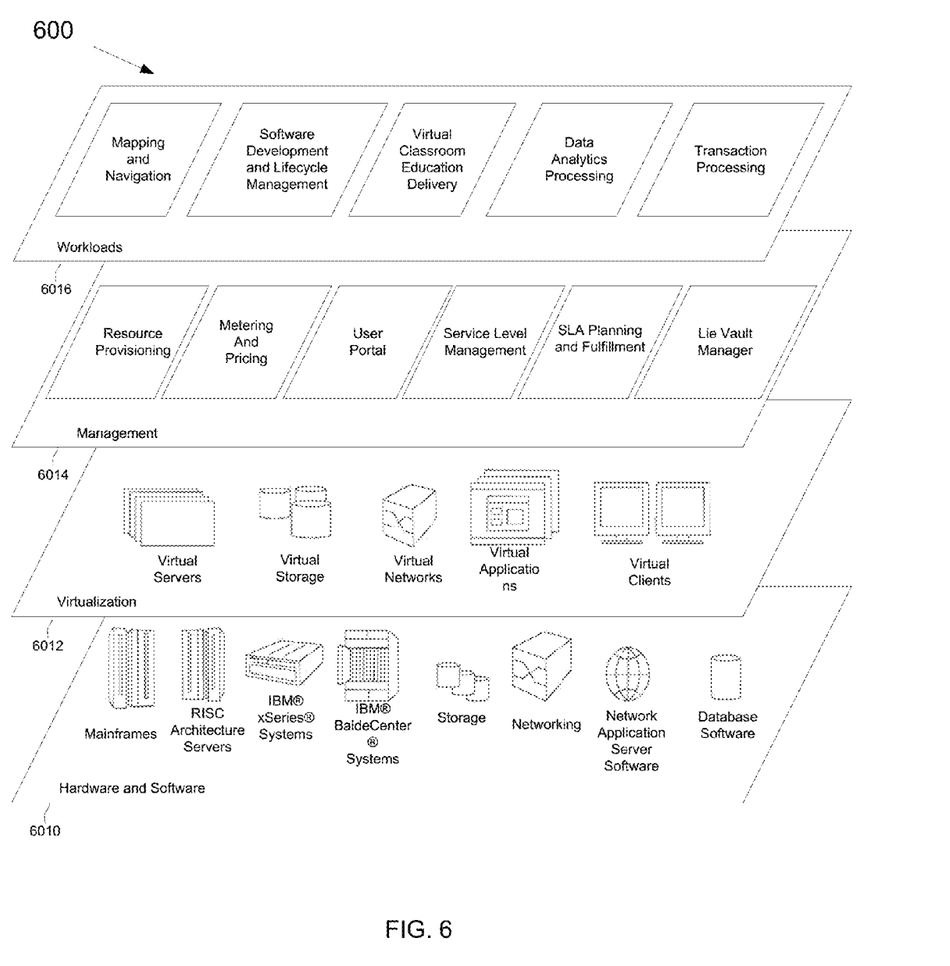
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 6010 includes hardware and software components. Examples of hardware components include: mainframes; RISC (Reduced Instruction Set Computer) architecture based servers; storage devices; networks and networking components. In some embodiments, software components include network application server software.

Virtualization layer 6012 provides an abstraction layer from which the following examples of virtual entities may be provided: virtual servers; virtual storage; virtual networks, including virtual private networks; virtual applications and operating systems; and virtual clients.

In one example, management layer 6014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Lie Vault program may manage one or more personas to facilitate the user in recalling challenge question transformations.

Workloads layer 6016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to create and store at least one challenge question transformation (CQT), the method comprising:
    suggesting, via a graphical user interface, a challenge-response transformation to a user to assist the user with creating the at least one CQT associated with a password-recovery challenge question, wherein the challenge-response transformation assists with creating an altered answer to the password-recovery question;
    in response to a confirmation from the user, storing the at least one CQT in a repository;
    mapping the stored at least one CQT to the password-recovery challenge question;
    receiving an access query to a user interface associated with the password-recovery challenge question;
    associating the at least one stored CQT with the password-recovery challenge question;
    retrieving the associated CQT from the storage repository;
    displaying the password recovery question on a first device associated with the user interface;
    in response to detecting a second device, sending an audio clue via the detected second device, wherein the second device is wearable, and wherein the sent audio clue includes transformation steps associated with the retrieved CQT; and
    in response to receiving an answer that matches the transformation steps associated with the retrieved CQT on the first device, displaying, on the first device, a plurality of information associated with the received access query.

2. The method of claim 1, wherein the storing of the at least one challenge question transformation is associated with an additional real world context surrounding an accessing of the user interface.

3. The method of claim 1, wherein a plurality of personas is managed to assist a user in recalling the at least one stored challenge question transformation (CQT).

4. The method of claim 1, wherein the at least one challenge question transformation (CQT) is suggested to a user.

5. The method of claim 3, wherein at least one humanoid image is associated with at least one persona within the plurality of personas.

6. The method of claim 3, wherein a virtual universe is used to manage the plurality of personas.

7. The method of claim 3, wherein a cognitive persona suggester (CPS) is used to show one or more personas within the plurality of personas to the user in order to assist the user in recalling the at least one stored challenge question transformation (CQT).

8. The method of claim 1, wherein the challenge response transformation suggested to the user can be configured with respect to difficulty for the user and a device associated with the user.

9. A computer system to create and store at least one challenge question transformation (CQT), the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   suggesting, via a graphical user interface, a challenge-response transformation to a user to assist the user with creating the at least one CQT associated with a password-recovery challenge question, wherein the challenge-response transformation assists with creating an altered answer to the password-recovery question;
   in response to a confirmation from the user, storing the at least one CQT in a repository;
   mapping the stored at least one CQT to the password-recovery challenge question;
   receiving an access query to a user interface associated with a password-recovery challenge question;
   associating the at least one stored CQT with the password-recovery challenge question;
   retrieving the associated CQT from the storage repository;
   displaying the password recovery question on a first device associated with the user interface;
   in response to detecting a second device, sending an audio clue via the detected second device, wherein the second device is wearable, and wherein the sent audio clue includes transformation steps associated with the retrieved CQT; and
   in response to receiving an answer that matches the transformation steps associated with the retrieved CQT on the first device, displaying, on the first device, a plurality of information associated with the received access query.

10. The computer system of claim 9, wherein the storing of the at least one challenge question transformation is associated with an additional real world context surrounding an accessing of the user interface.

11. The computer system of claim 9, wherein a plurality of personas is managed to assist a user in recalling the at least one stored challenge question transformation (CQT).

12. The computer system of claim 9, wherein the at least one challenge question transformation (CQT) is suggested to a user.

13. The computer system of claim 11, wherein at least one humanoid image is associated with at least one persona within the plurality of personas.

14. The computer system of claim 11, wherein a virtual universe is used to manage the plurality of personas.

15. The computer system of claim 11, wherein a cognitive persona suggester (CPS) is used to show one or more personas within the plurality of personas to the user in order to assist the user in recalling the at least one stored challenge question transformation (CQT).

16. The method computer system of claim 9, wherein the challenge response transformation suggested to the user can be configured with respect to difficulty for the user and a device associated with the user.

17. A computer program product to create and store at least one challenge question transformation (CQT), the computer program product comprising:
   one or more computer-readable storage devices and program instructions stored on at least one of the one or more tangible storage devices, the program instructions executable by a processor, the program instructions comprising:
   program instructions to suggest, via a graphical user interface, a challenge-response transformation to a user to assist the user with creating the at least one CQT associated with a password-recovery challenge question, wherein the challenge-response transformation assists with creating an altered answer to the password-recovery question;
   in response to a confirmation from the user, program instructions to store the at least one CQT in a repository;
   program instructions to map the stored at least one CQT to the password-recovery challenge question;
   program instructions to receive an access query to a user interface associated with a password-recovery challenge question;
   program instructions to associate the at least one stored CQT with the password-recovery challenge question;
   program instructions to retrieve the associated CQT from the storage repository;
   program instructions to display the password recovery question on a first device associated with the user interface;
   in response to detecting a second device, program instructions to send an audio clue via the detected second device, wherein the second device is wearable, and wherein the sent audio clue includes transformation steps associated with the retrieved CQT and
   in response to receiving an answer that matches the transformation steps associated with the retrieved CQT on the first device, program instructions to display, on the first device, a plurality of information associated with the received access query.

18. The computer program product of claim 17, wherein the storing of the at least one challenge question transformation is associated with an additional real world context surrounding an accessing of the user interface.

* * * * *